United States Patent [19]
Dean

[11] Patent Number: 5,165,444
[45] Date of Patent: Nov. 24, 1992

[54] SPILL VALVE

[75] Inventor: Robert H. Dean, Evanston, Ill.

[73] Assignee: Midland Manufacturing Corp., Skokie, Ill.

[21] Appl. No.: 765,971

[22] Filed: Sep. 26, 1991

[51] Int. Cl.[5] .......................................... F16K 17/168
[52] U.S. Cl. .................................................... 137/469
[58] Field of Search ............... 137/469, 475, 476, 477, 137/478, 533.19, 533.21, 533.31, 534, 493.8

[56] References Cited

U.S. PATENT DOCUMENTS

| | | | |
|---|---|---|---|
| 496,058 | 4/1893 | Lohbiller | 137/469 X |
| 1,373,906 | 4/1921 | Needham | 137/533.21 X |
| 1,432,111 | 10/1922 | Lewis . | |
| 1,480,155 | 1/1924 | Darling . | |
| 1,620,719 | 3/1927 | Buck | 137/469 |
| 2,732,856 | 1/1956 | Jurs et al. | 137/498.8 X |
| 2,968,295 | 1/1961 | Haller | 137/469 X |
| 3,411,530 | 11/1968 | Powell | 137/475 |
| 3,757,815 | 9/1973 | Orr | 137/475 |
| 3,783,767 | 1/1974 | Stalker | 137/533.19 X |
| 3,945,607 | 3/1976 | Dashner . | |
| 4,036,250 | 7/1977 | Dashner | 137/476 |
| 4,171,712 | 10/1979 | DeForrest . | |
| 4,275,759 | 6/1981 | Huang | 137/533.19 X |
| 4,498,493 | 2/1985 | Harris . | |
| 4,674,530 | 6/1987 | Bickford | 137/469 |
| 5,048,560 | 9/1991 | Jannotta et al. | 137/493.8 |

Primary Examiner—Stephen M. Hepperle
Attorney, Agent, or Firm—Emrich & Dithmar

[57] ABSTRACT

The spill valve includes an annular seat surrounding a circular port in the top of a tank containing liquid under pressure and a circular poppet valve member movable between open and closed positions relative to the seat. A plate overlies the valve member and extends laterally therebeyond and is integral around its periphery with a depending skirt which overlaps the seat around its perimeter and is spaced a slight lateral clearance distance therefrom for cooperation therewith and with the valve member to define an annular chamber when the valve is closed, the extension plate effectively increasing the valve member area against which the internal tank pressure is exerted when the valve member moves from its closed position. The valve is biased closed by a plurality of free weights which sit atop the extension plate. Opening movement of the valve is stopped by a stop plate which is spaced above the valve seat by support rods which extend through complementary openings in the extension plate such that the distance between the closed and fully open positions of the valve is more than one-half the diameter of the port. A handle is fixed to the valve member and extends outwardly therefrom through complementary openings in the extension plate, the weights and the stop plate. The port is defined by a nozzle structure which is arcuately tapered laterally outwardly and toward the tank wall to improve flow.

18 Claims, 2 Drawing Sheets

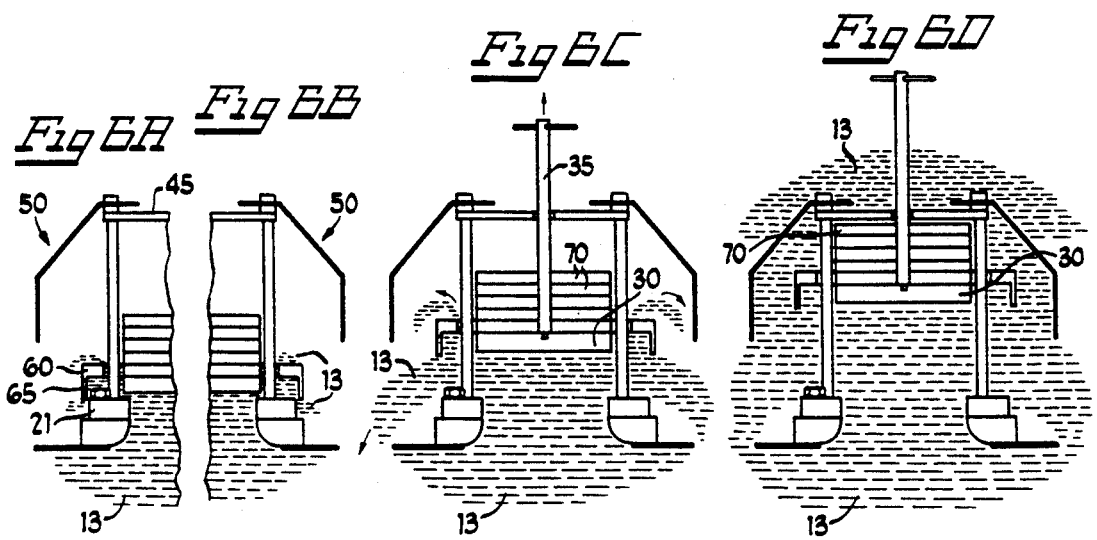
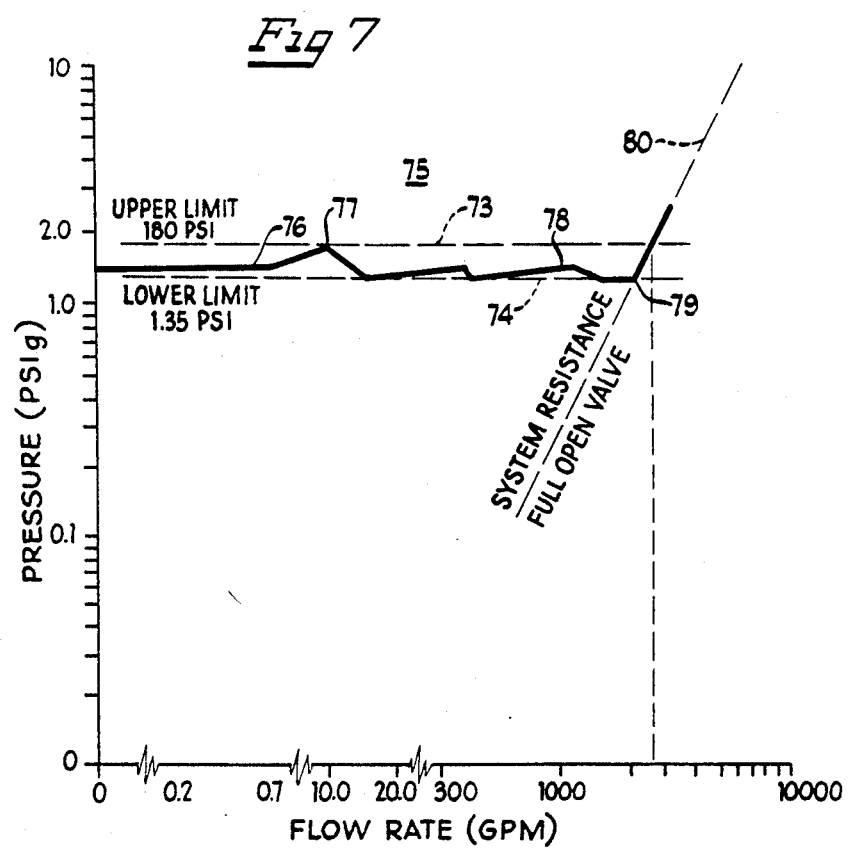

SPILL VALVE

BACKGROUND OF THE INVENTION

1. Field of the Invention

The present invention relates to spill valves, i.e., tank overflow valves which relieve liquid from tanks in an overfill condition when the pressure exceeds a predetermined limit, thereby to protect against rupture of the tank. The invention has particular application to marine liquid cargo tanks.

2. Description of the Prior Art

Industry standards, government regulations and international conventions require certain safety features in liquid cargo tanks, including marine cargo tanks. One such common safety feature is the provision of overflow or spill valves. Such valves are designed to protect against rupture or other damage to the tank in the event of an overfill condition. Typically, liquid is introduced to the tank under pressure exerted by pumps or the like during the filling operation. If the filling operation is not terminated at or before the time the tank is filled, liquid pressure may build up in the tank and eventually cause it to rupture. Marine cargo tanks, such as in barges or the like, may rupture at superatmospheric pressures in the range of from about 1 psig to about 3 psig. A spill valve is biased closed with a predetermined force such that the valve will open at a predetermined liquid pressure in the tank which is less than the pressure at which the tank will rupture, thereby relieving liquid from the tank and preventing further pressure buildup.

Prior spill valves are typically of the poppet type and include a valve plate which is biased to a closed position against a seat. Heretofore, spill valve designs have typically prescribed a valve travel between closed and fully open positions through a distance which is approximately one-quarter the diameter of the port opening which is controlled by the valve. Thus, the maximum flow rate through the open valve is limited. The junction between the port nozzle and the tank wall has typically been a right angle, which results in a flow coefficient of approximately 0.68, which further serves to limit flow through the valve. The maximum flow rate through the spill valve, in turn, limits the filling rate of the tank since if the filling rate exceeds the maximum flow rate through the spill valve, pressure will continue to build up in the tank even after the spill valve is fully opened.

In prior poppet-type spill valves, when the valve first starts to open the liquid will exit laterally around the perimeter of the poppet through a very narrow annular opening. The flow through this reduced opening produces a Venturi effect with increased flow rate an locally reduced pressure. This tends to reduce the overall lifting force on the poppet, requiring a correspondingly higher tank pressure in order to continue to move the poppet in an opening direction.

Furthermore, it has been found that in prior poppet-type spill valve designs the valve member tends to oscillate between open and closed positions once it has been opened, i.e., it will fluctuate between the fully open and closed conditions, sometimes with such force that it can deflect the tank wall. This not only impairs flow through the valve, but also can result in damage to the valve or to the tank wall.

Typically, the spill valve has an elastomeric seal element disposed for engagement with the valve member and the seat when the valve is closed to provide a fluid-tight seal. In marine applications the seal region is subject to damage and degradation from weather, such as boarding seas, from debris, such as sand and the like, and from icing buildup conditions. This may necessitate replacement of the elastomeric seal element. Typically, the valve member is spring-biased to its closed position and the valve construction is such that in order to permit cleaning or servicing of the valve structure and/or repair or replacement of the seal element, it is necessary for the valve to be disassembled.

Another drawback of prior spill valve designs is that, when the valve is open, the liquid lading which is exiting the valve under pressure, is squirted out either upwardly, much like a geyser, or laterally to the side. In either event, it may spray a considerable distance and constitute a hazard for tankermen in the vicinity.

SUMMARY OF THE INVENTION

It is a general object of the invention to provide an improved spill valve for a tank containing liquid under pressure, which avoids the disadvantages of prior spill valves while affording additional structural and operating advantages.

An important feature of the invention is the provision of a poppet-type spill valve which is of relatively simple and economical construction.

Another feature of the invention is the provision of a spill valve of the type set forth which maximizes flow therethrough for a given valve opening size.

In connection with the foregoing feature, another feature of the invention is the provision of spill valve of the type set forth which has an increased travel between the closed and fully open positions.

In connection with the foregoing features, a further feature of the invention is the provision of a spill valve of the type set forth which has a port design which optimizes fluid flow therethrough.

Another feature of the invention is the provision of a spill valve of the type set forth which effects maximum flow at a reduced tank pressure.

In connection with the foregoing feature, another feature of the invention is the provision of a spill valve of the type set forth which effectively increases the valve area against which the tank pressure operates.

A further feature of the invention is the provision of a spill valve of the type set forth which minimizes any Venturi effect in the initial opening stages of the valve.

A still further feature of the invention is the provision of a spill valve of the type set forth which minimizes valve oscillation.

Still another feature of the invention is the provision of a spill valve of the type set forth which protects the seal area of the valve from weather and the like.

Another feature of the invention is the provision of a spill valve of the type set forth which permits manual operation to facilitate cleaning and servicing.

It is another feature of the invention to provide a spill valve of the type set forth which serves to deflect exiting fluid back toward the tank to minimize hazard to tankermen.

These and other features of the invention are attained by providing a poppet-type spill valve for a tank containing liquid under pressure and having a valve port therein comprising: valve seat means encompassing the port, a valve member movable between a closed position against the seat means for closing the port and a fully open position spaced from the seat means, resilient seal means disposed for engagement with the valve seat means and the valve member in the closed position thereof for providing a fluid-tight seal therebetween, bias means disposed for biasing the valve member toward the closed position thereof with a predetermined force, and extension means coupled to the valve member for cooperation therewith and with the valve seat means in the closed position of the valve member for defining a substantially closed chamber, the chamber extending from the valve seat means in the valve opening direction and extending from the valve member in directions substantially perpendicular to the valve opening direction and being out of communication with the port when the valve member is in its closed position, the chamber communicating with the port when the valve member moves in the opening direction from its closed position so that the extension means effectively increases the area of the valve member against which internal tank pressure is exerted.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary view in vertical section illustrating a spill valve constructed in accordance with and embodying the features of the present invention, with the valve illustrated in it closed position;

FIG. 2 is a reduced, top plan view of the spill valve of FIG. 1;

FIG. 3 is a reduced view in horizontal section taken along the line 3—3 in FIG. 1;

FIG. 4 is a reduced, fragmentary view in horizontal section taken along the line 4—4 in FIG. 1;

FIG. 5 is an enlarged, fragmentary sectional view of a portion of the spill valve of FIG. 1;

FIGS. 6A-6D are reduced diagrammatic views, similar to FIG. 1, respectively illustrating four different degrees of opening of the spill valve; an FIG. 7 is a log/log graph of pressure against flow rate through the spill valve of FIG. 1, with the horizontal axis being broken to conserve space.

DESCRIPTION OF THE PREFERRED EMBODIMENT

Referring to FIG. 1, there is illustrated a portion of the top of a tank 10 on which is mounted a spill valve assembly 20 constructed in accordance with and embodying the features of the present invention. The tank 10 has a top wall 11 in which are formed one or more circular valve openings 12 (one shown). The tank 10 is designed for holding liquid lading 13 (see FIGS. 6A-D) and may be a marine cargo tank, such as on a barge or other type tanker vessel. Secured to the top wall 11 around the perimeter of the opening 12, as by weldments 14, is an annular nozzle structure 15, which has a convex inner wall 16. In transverse axial cross section the wall 16 is arcuately tapered from the radially inner edge of a flat annular face 17 radially outwardly and axially downwardly to the top wall 11 at the edge of the opening 12. Thus, the nozzle structure 15 defines a port 18 which smoothly and gradually decreases from the edge of the opening 12 to the inner edge of the annular face 17. Fixedly secured to the nozzle structure 15 and projecting vertically upwardly therefrom at equiangularly spaced apart locations therearound radially outwardly of the annular face 17 are a plurality of externally threaded studs 19.

Referring now also to FIGS. 2-5, the spill valve assembly 20 includes an annular base 21, which has a flat, horizontal, annular surface 22 (FIG. 1) which is dimensioned substantially the same as the annular face 17 of the nozzle structure 15. In use, the base 21 is positioned with the annular surface 22 disposed in facing relationship with the annular face 17 coaxially therewith with a gasket 23 disposed therebetween. The base 21 has a circularly cylindrical inner surface 24 which intersects the inner edge of the annular surface 22 perpendicularly thereto, and the base 21 extends radially outwardly beyond the outer edge of the annular surface 22 to cylindrical outer surface 24a which is coaxial with the inner surface 24. Disposed on the base 21 at the end thereof opposite the annular surface 22 and parallel thereto is an annular seat surface 25 which extends between the cylindrical surfaces 24 and 24a.

Formed in the seat surface 25 adjacent to the inner cylindrical surface 24 is an annular groove 26 (see FIG. 5), which is preferably generally trapezoidal in shape, and in which is disposed an elastomeric seal ring 27 which normally projects a slight distance above the seat surface 25. Preferably, the seal ring 27 is relatively soft, having a 50 durometer hardness rating. Formed through the base 21 parallel to the axis thereof and radially outwardly of the annular surface 22 are a plurality of stud holes 28 (FIG. 1) positioned for respectively receiving the studs 19 therethrough. Nuts 29 are threadedly engageable with the studs 19 for clamping together the valve base 21, the gasket 23 and the nozzle structure 15 in the assembled configuration illustrated in FIG. 1, in which the inner cylindrical surface 24 of the base 21 is coaxial with the nozzle structure 15, the surface 24 having a diameter substantially the same as the minimum inner diameter of the nozzle structure arcuate wall 16 and forming an outward extension thereof.

In the preferred embodiment of the invention, the spill valve assembly 20 is an 8-inch valve which is defined by the diameter of the inner cylindrical surface 24 of the valve base 21. Preferably, the parts are so dimensioned that the axial or vertical distance between the inner surface of the tank wall 11 and the seat surface 25 of the valve is no more than about three inches. This limits the liquid pressure head which can develop within the tank 10. It is a significant aspect of the invention that the tapered curvature of the arcuate inner wall 16 of the nozzle structure 15 produces a flow coefficient of 0.98, which results in a significantly increased flow rate through the port 18 as compared with prior art constructions wherein the cylindrical inner surface of the nozzle intersects the tank wall 11 at a right angle.

The valve assembly 20 also includes a circular valve plate 30 which has a flat planar valve surface 31 with a diameter slightly greater than the diameter of the seal ring 27. The valve surface 31 is disposed against the seat surface 25 in fluid-tight sealing relationship with the seal ring 27 when the valve assembly 20 is disposed in its closed condition, illustrated in FIG. 1. Formed in the top of the valve plate 30 centrally thereof is a cylindrical recess 32, in which is fixedly seated a reduced-diameter stud 33 of an elongated handle shaft 35, which is preferably secured to the valve plate 30 as by suitable weldments. The handle shaft 35 extends axially upwardly from the valve plate 30 a substantial distance and is provided adjacent to its distal end with a diametric bore 36 therethrough in which is received a handle pin 37, which is tethered to the distal end of the handle shaft 35 by a suitable tether cord or cable 38.

The valve assembly 20 also includes four support posts 40, preferably in the form of elongated shoulder bolts, which have threaded stud ends 41 at the lower ends thereof respectively threadedly engaged in complementary recesses formed in the seat surface 25 at equiangularly spaced-apart locations thereon radially between the stud holes 28 and the valve plate 30. The support posts 40 extend upwardly parallel to the axis of the port 18 and terminate at externally threaded upper stud ends 42. A rectangular stop plate 45 is supported on the support posts 40 at the upper ends thereof, the stop plate 45 having four holes 46 therethrough for respectively receiving the stud ends 42 of the support posts 40, and having a central hole 47 therethrough for receiving the upper end of the handle shaft 35. The stop plate 45 is secured in place on the support posts 40 by nuts 49.

Also supported on the support posts 40 is a deflector hood 50, which is substantially square in transverse cross section, having a substantially square top wall 51 slightly larger than the stop plate 45 and provided with four complementary openings therethrough for respectively receiving the support post stud ends 42, being secured in place by nuts 52. If desired, washers 53 may separate the nuts 49 and 52 from the top wall 51. The top wall 51 has a large, circular, central opening 54 therethrough through which the handle shaft 35 extends. Integral with the top wall 51 at the periphery thereof is a downwardly and outwardly sloping frustopyramidal wall section 55, which is integral at its lower end with a vertically depending square wall section 56 which is sized to completely encompass the nozzle structure 15. While in the illustrated embodiment the stop plate 45 and the deflector hood 50 are square in shape it will be appreciated that they could also be circular.

The valve assembly 20 is also provided with a flat, circular, extension plate 60 which overlies the valve plate 30 in use coaxially therewith. More specifically, the extension plate 60 has a center hole 61 therethrough for receiving the handle shaft 35, the hole 61 preferably being counterbored at its lower end to provide adequate clearance for the handle shaft weldments. The extension plate 60 has a diameter which is slightly greater than the diameter of the outer cylindrical surface 24a of the valve base 21 and has four post holes 62 therethrough positioned for respectively receiving the support posts 40. Fixedly secured to the bottom surface 64 of the extension plate 60 at the outer edge thereof, as by welding, and depending vertically therefrom is a cylindrical skirt 65. The skirt 65 is so dimensioned and positioned that its lower end vertically overlaps the cylindrical outer surface 24 of the valve base 21 a predetermined distance and is radially outwardly spaced therefrom by a very slight clearance distance 66 (FIG. 4) when the valve plate 30 is disposed in its closed condition, illustrated in FIG. 1. In the preferred 8-inch valve embodiment, the vertical overlap of the skirt 65 with the base 21 is about ⅜ inch and the radial clearance therefrom is no more than ⅛ inch. It can be seen that the extension plate 60 and the skirt 65 cooperate with the valve base 21 and the valve plate 30 to define therebetween an annular, substantially closed chamber 68. In the preferred embodiment the width of the annular chamber 68, i.e., the distance between the inner surface of the skirt 65 and the outer peripheral surface of the valve plate 30, is approximately 2-¼ inches. The axial height of the chamber 68, which is determined by the thickness of the valve plate 30, is such as to accommodate the nuts 29 and the upper ends of the studs 19 and, in the preferred 8-inch valve embodiment, is approximately 1-¼ inches.

The valve assembly 20 also includes one or more free weights 70, each in the form of a circular disk or plate having a substantially the same as that of the valve plate 30. In use, the requisite number of weights 70 are stacked atop the extension plate 60 coaxially therewith, each of the weights 70 having a central hole 71 therethrough for accommodating the handle shaft 35. The weights 70 cooperate with the extension plate 60, under the action of gravity, to bias the valve plate 30 to its closed condition. If desired, the weights 70 could have a diameter substantially the same as that of the extension plate 60, so as to permit a greater weight loading end to minimize the stack height of the weights. In this case, of course, the weights would require additional openings therethrough to accommodate the support posts 40.

Referring now also to FIGS. 6A-6D and 7, the operation of the valve assembly 20 will be described. FIG. 7 is a graph of liquid pressure in the tank 10 against flow rate through the spill valve assembly 20. For purposes of illustration, it will be assumed that the tank 10 has a rupture pressure of between 2.0 and 3.0 psig. Thus, the spill valve assembly 20 is designed to have an opening pressure of 1.5 psig to provide an adequate margin of safety. Industry and government standards require that, at the maximum flow rate through the spill valve, the tank pressure not exceed 120% of the set opening pressure. This results in an upper pressure limit of 1.8 psig, indicated by the dashed line 73 in FIG. 7. The standards also require that the spill valve be vapor tight at 90% of the set opening pressure, which results in a lower limit of 1.35 psig, indicated by the dashed line 74 in FIG. 7. Thus, the valve assembly 20 cannot be permitted to be open at a pressure of less than 1.35 psig or it will not meet the vapor tightness standard. It will further be assumed that the maximum rate at which the tank 10 will be filled is 2500 gallons per minute, indicated by the vertical dashed line in FIG. 7. It can be seen from FIG. 7 that the pressure vs. flow rate curve 75 for the spill valve assembly 20 is between the upper and lower limits 73 and 74 at all flow rates less than the maximum fill rate.

When the tank 10 has been completely filled, as the pressure within the tank 10 begins to rise, the liquid lading 13 will rise up within the port 18 until it is in contact with the valve surface 31 of the valve plate 30. The biasing weight on the valve plate 30 is such that, when the tank pressure exceeds about 1.5 psig, the valve plate 30 will begin to unseat. The initial movement will be very small and will simply decompress the seal ring 27 and permit no more than a trickle of liquid lading to flow from the spill valve assembly 20. As the pressure increases the flow through the valve will gradually increase to approximately 0.7 gallons per minute ("GPM"), as indicated by the portion 76 of the curve 75 in FIG. 7. During this portion of the curve, any liquid which escapes will flow into the chamber 68 and exit through the clearance space 66, as indicated in FIG. 6A.

As the pressure continues to rise toward the upper limit of 1.8 psig, the valve plate 30 will raise a slight distance more and the flow rate will gradually increase to about 10.0 GPM at point 77 of the curve 75. During this portion of the curve 75, the liquid lading exiting the valve assembly 20 flows into the chamber 68, as indicated in FIG. 6B, which chamber remains substantially closed since the valve plate 30 has not lifted sufficiently to remove the overlap between the skirt 65 and the valve base 21. This has two significant effects. First of all, the skirt 65 blocks the laterally outward flow of the liquid lading and forces the liquid to escape through the clearance space 66 and through the post holes 62, thereby reducing the radial flow rate between the valve plate 30 and the seat surface 25. This minimizes the Venturi effect at this location and permits the valve to continue to open without excessive pressure buildup in the tank 10.

Furthermore, the bottom surface 64 of the extension plate 60 which forms the top of the chamber 68 serves to enlarge the surface area of the piston formed by the valve surface 31. Thus, since the liquid pressure is now operating against a larger piston area, it exerts a greater force. Accordingly, the biasing force on the valve plate 30 caused by the weights 70 can be overcome at a lower tank pressure. This serves to provide added insurance that the tank rupture pressure will not be approached and further makes it easier to satisfy the vapor tightness standards.

Because of this increased piston effect of the extension plate 60, the valve assembly 20 will open more rapidly and the pressure will initially drop and will fluctuate somewhat between the upper and lower limits 73 and 74 such that, when the valve plate 30 has lifted approximately half way to its fully open position, as indicated in FIG. 6C and at point 78 of curve 75, the valve plate 30 is spaced far enough from the base 21 at this point that the liquid exiting the valve can flow laterally outwardly fairly freely. The extension plate 60 and the skirt 65 are still close enough to the base 21, however, to intercept that portion of the flow which is angled upwardly and redirect it downwardly, as indicated in FIG. 6C. An even greater volume of liquid is now forced up through the post holes 62, but this flow is intercepted and deflected back downwardly by the deflector hood 50.

The valve assembly 20 continues to open until it has reached its fully open position, illustrated in FIG. 6D and indicated by the point 79 on curve 75. Further opening movement is prevented by engagement of the top one of the weights 70 with the stop plate 45. At this point, the curve 75 intersects the system resistance curve, indicated by the dashed line 80 in FIG. 7, which represents the pressure vs. flow rate characteristic of the valve assembly 20 when it is held in its fully open position. The flow rate at point 79 is approximately 2000 GPM and the pressure is at the lower limit of 1.35 psig. Since the valve can open no further, any further increase in the fill rate will cause the tank pressure and the flow rate through the open valve assembly 20 to rise along the system resistance curve 80. It can be seen from FIG. 7, that this curve intersects the upper limit 73 of the tank pressure at the maximum fill rate of 2500 GPM. At this point the liquid exiting the valve will well up inside the deflector hood 50, the major part of the flow being deflected back downwardly by the hood 50 and a portion of it escaping between the deflector hood 50 and the stop plate 45 and out the top opening 54 in the deflector hood 50, as illustrated in FIG. 6D. However, at this point pressure has been reduced sufficiently that the flow will not rise very high above the top of the deflector hood 50 and will flow down along the outside thereof.

It will be appreciated that, when the spill valve assembly 20 is open, the valve plate 30 and the extension plate 60 and the weights 70 supported thereby will be supported atop a column of liquid. It has been found that, by the use of the extension plate 60 and skirt 65 of the present invention, the oscillation of the valve plate 30 is substantially reduced so that its fluctuations are limited to a range of an inch or so such as not to substantially affect the flow through the valve assembly 20 or affect the integrity of the tank 10. Furthermore, the added piston area provided by the extension plate 60 permits the valve assembly 20 to open at a lower tank pressure, so that the entire curve 75 in FIG. 7 is lower than it would ordinarily be, with the attendant advantages discussed above.

Another significant feature of the invention is that it provides for maximized flow for a given flow diameter at minimum tank pressure It has been found that the present invention permits the poppet of the valve assembly 20 to be lifted substantially more than half the diameter of the port 18. More specifically, it has been found that the optimum lift is approximately 0.8 times the diameter of the port 18. Thus, in the preferred embodiment for an 8-inch valve, the valve plate 30 moves approximately 6.4 inches between the closed and fully open positions thereof. This permits a considerably greater flow than in prior poppet-type spill valves. Furthermore, the unique design of the nozzle structure 15 substantially increases the flow coefficient from about 0.68 to about 0.98, thereby further increasing the maximum flow. The net result is that the curve 75 in FIG. 7 intersects the system resistance curve 80 at a significantly higher flow rate than was the case in previous designs, which permits the use of higher fill rates in filling the tank 10.

It is a significant aspect of the invention that, as flow through the spill valve 20 decreases, the valve assembly will automatically reclose and will seal at about 1.35 psig. Thus, the tank 10 is not left open, and the valve assembly 20 does not require manual reclosing or resetting.

As can be seen from FIG. 1 when the valve assembly 20 is in its closed position, the deflector hood 50 and the extension plate 60 and the skirt 65 cooperate to protect the seal region between the valve plate 30 and the seat surface 25 from damage by weather, debris and the like. Boarding waves on a tanker vessel cannot directly impact the seal area. While water can enter the chamber 68 through the post holes 62, it readily drains through the clearance opening 66. It will further be appreciated that the extension plate 60 cooperates with the support posts 40 and with the handle shaft 35 to provide a guided movement of the valve plate 30 between its open and closed positions, thereby insuring that the valve plate 30 will remain coaxial with the port 18 and accurately engage the seal ring 27 when the valve recloses.

A significant aspect of the invention is that, in the event it is necessary to replace or repair the seal ring 27 or effect other service procedures, the valve assembly 20 can be manually opened by engaging the handle pin 37 in the handle shaft bore 36 and pulling up on the handle pin 37, thereby to provide access to the seal ring 27. It is not necessary to disassemble any part of the valve assembly 20.

While, in the preferred embodiment of the present invention, the port 18 has an 8-inch diameter, since this is the smallest standard valve opening used on tanker barges, it will be appreciated that the principles of the present invention are readily applicable to other size valves, such as 10-inch and 12-inch valves. In the event a larger valve opening is used, the dimensions of the valve assembly 20 need only be scaled up accordingly. The amount of biasing weight required in the valve assembly 20 is a function of the port diameter, the maximum fill rate and the tank burst pressure, and can be readily calculated to provide the desired valve opening pressure.

From the foregoing, it can be seen that there has been provided an improved spill valve which provides for maximum flow rate at minimum tank pressure, avoids valve oscillation, protects the seal region of the valve from damage and confines the flow of liquid from the valve to the immediate vicinity of the valve.

I claim:

1. A poppet-type spill valve for a tank containing liquid under pressure and having a valve port therein comprising: valve seat means encompassing the port, a valve member movable between a closed position against said seat means for closing the port and a fully open position spaced from said seat means, resilient seal means disposed for engagement with said valve seat means and said valve member in the closed position thereof for providing a fluid-tight seal therebetween, bias means disposed for biasing said valve member toward the closed position thereof with a predetermined force, and extension means coupled to said valve member for cooperation therewith and with said valve seat means in the closed position of said valve member for defining a substantially closed chamber, said extension means including a first portion extending laterally outwardly from said valve member around the entire perimeter thereof and spaced a first distance from said valve seat means in the valve opening direction, and a second portion integral with said first portion around the periphery thereof and extending therefrom toward said valve seat means, said second portion overlapping said valve seat means around the entire perimeter thereof and spaced laterally outwardly therefrom a second distance substantially less than said first distance when said valve member is disposed in its closed position, said chamber extending from said valve seat means in the valve opening direction and extending from said valve member in directions substantially perpendicular to the valve opening direction and being out of communication with the port when said valve member is in its closed position, said chamber communicating with the port when said valve member moves in the opening direction from its closed position so that said extension means effectively increases the area of said valve member against which internal tank pressure is exerted.

2. The spill valve of claim 1, wherein the port is formed in the top of the tank and is circular in shape, said valve seat means being annular and coaxial with the port, said valve member being movable substantially vertically between the open and closed positions thereof.

3. The spill valve of claim 2, wherein said bias means includes one of more free weights overlying said valve member and gravitationally urging it toward its closed position.

4. The spill valve of claim 1, and further comprising handle means coupled to said valve member for effecting manual movement thereof between the open and closed positions thereof.

5. The spill valve of claim 1, and further comprising nozzle structure carried by the tank and defining the port, said nozzle structure in axial section being arcuately tapered laterally outwardly and toward the tank.

6. A poppet-type spill valve for a tank containing liquid under pressure and having a circular port therein comprising: valve seat means encompassing the port, a valve member movable between a closed position against said seat means for closing the port and a fully open position spaced from said seat means, resilient seal means disposed for engagement with said valve seat means and said valve member in the closed position thereof for providing a fluid-tight seal therebetween, bias means disposed for biasing said valve member toward the closed position thereof with a predetermined force, and stop means engageable with said valve member in the fully pen position thereof for limiting the opening movement thereof, said stop means being dimensioned and arranged such that the distance moved by said valve member between the closed and fully open positions thereof is approximately 0.8 times the diameter of the port.

7. The spill valve of claim 6, wherein the port is formed in the top of the tank, said bias means including one or more free weights overlying said valve member and gravitationally urging it towards it closed position.

8. The spill valve of claim 7, and further comprising handle means coupled to said valve member for effecting manual movement thereof between the open and closed positions thereof, each of said free weights having an opening therethrough through which said handle means extends in use.

9. The spill valve of claim 8, wherein said stop means includes a stop plate overlying said valve member and means supporting said stop plate a predetermined distance from said valve seat means in the valve opening direction, said stop plate having an opening therethrough through which said handle means extends in use.

10. The spill valve of claim 6, wherein said stop means includes a stop plate overlying said valve member and means supporting said stop plate a predetermined distance from said valve seat means in the valve opening direction.

11. The spill valve of claim 10 wherein said support means includes a plurality of elongated rods spaced apart about the perimeter of said port and interconnecting said valve seat means and said stop plate.

12. The spill valve of claim 11, and further comprising a deflector hood carried by said rods and extending laterally outwardly therefrom and toward said valve seat means for deflecting liquid ejected from the port back toward the tank.

13. The spill valve of claim 6, and further comprising nozzle structure carried by the tank and defining the port, said nozzle structure in axial section being arcuately tapered laterally outwardly and toward the tank.

14. A poppet-type spill valve for a tank containing liquid under pressure and having a circular port therein comprising: valve seat means encompassing the port, a valve member movable between a closed position against said seat means for closing the port and a fully open position spaced from said seat means, resilient seal means disposed for engagement with said valve seat means and said valve member in the closed position thereof for providing a fluid-tight seal therebetween, bias means disposed for biasing said valve member toward the closed position thereof with a predetermined force, extension means coupled to said valve member for cooperation therewith and with said valve seat means in the closed position of said valve member for defining a substantially closed chamber, said extension means including an extension plate overlying said valve member and extending laterally outwardly therebeyond around the entire perimeter thereof and spaced from said valve seat means in the valve opening direction, and a skirt integral with said plate around the periphery thereof and extending therefrom toward said valve seat means, said skirt overlapping said valve seat means around the entire perimeter thereof and spaced a very slight distance laterally outwardly therefrom when said valve member is disposed in its closed position, said chamber extending from said valve seat means in the valve opening direction and extending from said valve member in directions substantially perpendicular to the valve opening direction and being out of communication with the port when said valve member is in its closed position, said chamber communicating with the port when said valve member moves int e opening direction from its closed position so that said extension means effectively increases the area of said valve member against which internal tank pressure is exerted, and stop means engageable with said valve member in the fully open position thereof for limiting the opening movement thereof, said stop means being dimensioned and arranged such that the distance moved by said valve member between the closed and fully open positions thereof is more than half the diameter of the port.

15. The spill valve of claim 14 and further comprising handle means integral with said valve member and extending therefrom in the valve opening direction for manual movement thereof between the open and closed positions thereof, said plate having an opening therethrough through which said handle means extends in use.

16. The spill valve of claim 15, wherein the port is formed in the top of the tank, said bias means including one or more free weights overlying said plate an cooperating therewith to gravitationally urge said valve member toward its closed position, each of said free weights having an opening therethrough through which said handle means extends in use.

17. The spill valve of claim 16, wherein said stop means includes a stop plate disposed parallel to said extension plate, and a plurality of support rods spaced about the port and interconnecting said valve seat means and said stop plate, said extension plate having a plurality of openings therethrough for respectively receiving said support rods therethrough, whereby said support rods cooperate with said extension plate to guide the movement of said valve member between the open and closed positions thereof.

18. The spill valve of claim 14, and further comprising nozzle structure carried by the tank and defining said port, said nozzle structure in axial section being arcuately tapered outwardly toward the tank.

* * * * *

UNITED STATES PATENT AND TRADEMARK OFFICE
CERTIFICATE OF CORRECTION

PATENT NO. : 5,165,444
DATED : November 24, 1992
INVENTOR(S) : Robert H. Dean

It is certified that error appears in the above-identified patent and that said Letters Patent is hereby corrected as shown below:

Column 9, line 68, "of" should be --or--;

Column 10, line 23, "pen" should be --open--;

Column 11, line 27, "int e" should be --in the--; and

Column 12, line 13, "an" should be --and--.

Signed and Sealed this

Twenty-sixth Day of October, 1993

Attest:

BRUCE LEHMAN

*Attesting Officer*  *Commissioner of Patents and Trademarks*